United States Patent
Araki et al.

(10) Patent No.: US 9,865,881 B2
(45) Date of Patent: Jan. 9, 2018

(54) ELECTRODE ASSEMBLY, METHOD FOR PRODUCING ELECTRODE ASSEMBLY, AND ELECTRIC STORAGE DEVICE INCLUDING ELECTRODE ASSEMBLY

(71) Applicant: GS Yuasa International Ltd., Kyoto-shi, Kyoto (JP)

(72) Inventors: Takanobu Araki, Kyoto (JP); Takaaki Iguchi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 217 days.

(21) Appl. No.: 14/023,618

(22) Filed: Sep. 11, 2013

(65) Prior Publication Data
US 2014/0072877 A1 Mar. 13, 2014

(30) Foreign Application Priority Data

Sep. 13, 2012 (JP) ................................. 2012-201062
Aug. 14, 2013 (JP) ................................. 2013-168499

(51) Int. Cl.
*H01M 4/66* (2006.01)
*H01M 10/058* (2010.01)
(Continued)

(52) U.S. Cl.
CPC ............... *H01M 4/66* (2013.01); *H01M 4/13* (2013.01); *H01M 4/62* (2013.01); *H01M 4/667* (2013.01);
(Continued)

(58) Field of Classification Search
CPC ............. H01M 10/052; H01M 10/058; H01M 4/0402; H01M 4/13; H01M 4/62;
(Continued)

(56) References Cited

U.S. PATENT DOCUMENTS 9,478,366 B2    10/2016  Kunisawa
2004/0202928 A1*  10/2004  Miyamoto et al. ........... 429/137
(Continued)

FOREIGN PATENT DOCUMENTS

EP    2048726      4/2009
JP    62-160656    7/1987
(Continued)

OTHER PUBLICATIONS

Extended European Search Report dated Jan. 21, 2014 filed in corresponding European application No. 13183912.8.

*Primary Examiner* — Nicholas P D'Aniello
*Assistant Examiner* — Ling R Zeng
(74) *Attorney, Agent, or Firm* — Rankin, Hill & Clark LLP

(57) ABSTRACT

Provided is an electrode assembly including: a negative electrode including a negative electrode current collector (NC) and a negative electrode active material layer (NAL) disposed on at least one surface of the NC; a positive electrode including a positive electrode current collector (PC), a positive electrode active material layer (PAL) disposed on at least one surface of the PC, and an undercoat layer being disposed between the PC and the PAL and being higher in resistance value than the PC. The negative electrode and the positive electrode are stacked on each other. In at least one side of the thus stacked negative and positive electrodes, the NAL projects from an edge of the PAL in a direction in which the NC and PC extend, and the undercoat layer projects from an edge of the NAL in the direction.

5 Claims, 5 Drawing Sheets

(51) Int. Cl.
  *H01M 4/13*  (2010.01)
  *H01M 4/62*  (2006.01)
  *H01M 10/052*  (2010.01)
  *H01M 4/04*  (2006.01)

(52) U.S. Cl.
  CPC ....... *H01M 10/052* (2013.01); *H01M 10/058* (2013.01); *H01M 4/0402* (2013.01); *H01M 4/662* (2013.01); *Y10T 29/49115* (2015.01)

(58) Field of Classification Search
  CPC ........ H01M 4/66; H01M 4/662; H01M 4/667; H01M 4/661; H01M 4/82; H01M 4/84; Y02E 60/122; Y10T 29/49115
  See application file for complete search history.

(56) References Cited

U.S. PATENT DOCUMENTS

| | | |
|---|---|---|
| 2004/0219433 A1 | 11/2004 | Besner |
| 2005/0201041 A1 | 9/2005 | Katai |
| 2007/0048613 A1 | 3/2007 | Okumura |
| 2008/0299457 A1* | 12/2008 | Muraoka ............ H01M 4/0404 429/217 |
| 2009/0257171 A1 | 10/2009 | Yamazaki et al. |
| 2013/0089781 A1 | 4/2013 | Miyazaki et al. |
| 2014/0023919 A1* | 1/2014 | Minami ................ H01M 2/263 429/209 |
| 2015/0213967 A1 | 7/2015 | Kunisawa |

FOREIGN PATENT DOCUMENTS

| | | |
|---|---|---|
| JP | 2001085065 A2 | 3/2001 |
| JP | 2001-327906 | 11/2001 |
| JP | 2002075802 A2 | 3/2002 |
| JP | 2004259625 A2 | 9/2004 |
| JP | 2005183806 A2 | 7/2005 |
| JP | 2006-179370 | 7/2006 |
| JP | 2007095656 A2 | 4/2007 |
| JP | 2008-60060 | 3/2008 |
| JP | 2008300302 A2 | 12/2008 |
| JP | 2009-199960 | 9/2009 |
| JP | 2011-210549 | 10/2011 |
| JP | 2011-216403 | 10/2011 |
| JP | 2013206743 A2 | 10/2013 |
| WO | 2012/005301 | 1/2012 |
| WO | 2014034113 A1 | 3/2014 |

\* cited by examiner

F I G. 1
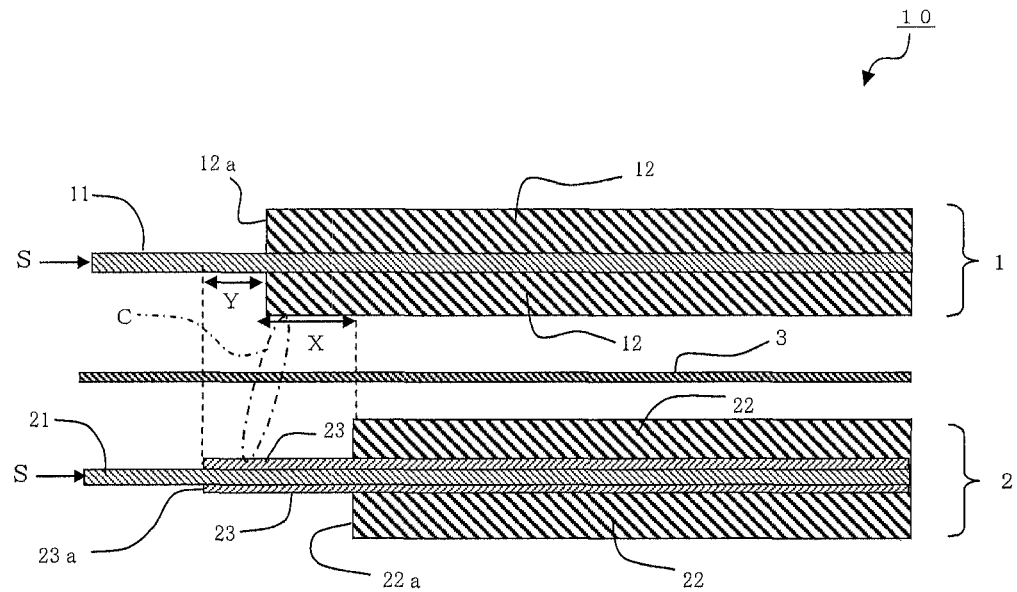
F I G. 2
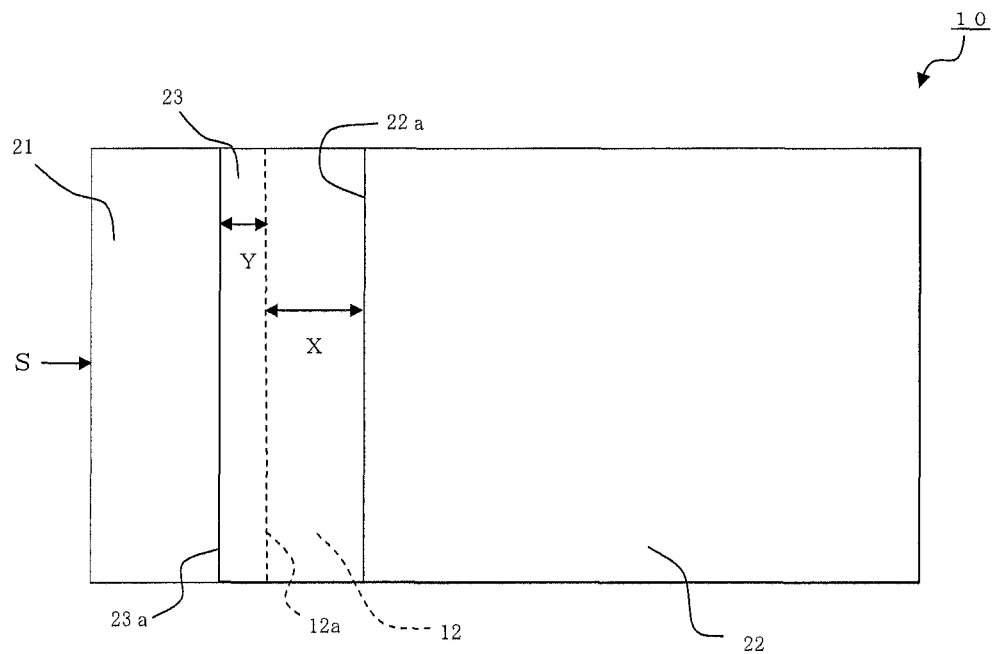

ELECTRODE ASSEMBLY, METHOD FOR PRODUCING ELECTRODE ASSEMBLY, AND ELECTRIC STORAGE DEVICE INCLUDING ELECTRODE ASSEMBLY

CROSS-REFERENCE TO RELATED APPLICATIONS

This application claims the benefit of Japanese Patent Application Nos. 2012-201062 and 2013-168499, filed on Sep. 13, 2012 and Aug. 14, 2013, respectively, which are incorporated herein by reference.

FIELD

The present invention relates to an electrode assembly, a method for producing an electrode assembly, and an electric storage device including the electrode assembly.

BACKGROUND

Recently, cells such as nonaqueous electrolyte cells or electric storage devices such as capacitors such as electric double layer capacitors have been frequently used in various uses.

In particular, nonaqueous electrolyte cells typified by lithium-ion battery cells have been frequently used as cells for consumer use such as cells for electronic devices, being increasingly reduced in size and weight, such as personal computers and communication devices such as cellular phones, or cells for electric vehicles such as hybrid electric vehicles (HEVs), plug-in hybrid electric vehicles (PHEVs) or electric vehicles (EVs).

As such electric storage devices, electrode assemblies formed by stacking positive electrodes and negative electrodes are widely used.

In the electrode assembly in such an electric storage device, the positive electrode and the negative electrode are each provided with a current collecting plate and a positive electrode active material layer or a negative electrode active material layer disposed on one surface or both surfaces of the current collecting plate. The positive electrode and the negative electrode are stacked on each other with a separator therebetween in such a way that the positive electrode active layer and the negative electrode active material layer face each other. Additionally, in the electrode assembly in such an electric storage device, for the purpose of enhancing the adhesiveness between the positive electrode active material layer or the negative electrode active material layer and the current collecting plate, an undercoat layer containing a conductive substance is disposed between the positive electrode active material layer or the negative electrode active material layer and the current collecting plate. Such an electrode assembly is described in Patent Literature 1 or 2.

As such an electrode assembly, as described in Patent Literature 3 and Patent Literature 4, there has been proposed an electrode assembly configured in such a way that when the stacking is performed so as for the positive electrode active material layer and the negative electrode active material layer to face each other, the area of the negative electrode active material layer is larger than the area of the positive electrode active material layer. In other words, there has been proposed an electrode assembly configured in such a way that the positive electrode active material layer and the negative electrode active material layer are disposed so as for the edge of the negative electrode active material layer to be placed outside the edge of the positive electrode active material layer.

An electrode assembly having such a configuration prevents the lithium ions released from the positive electrode active material layer from depositing on a portion of the negative electrode current collector, where no negative electrode active material layer is present, to be a cause for short-circuit.

However, even in an electrode assembly in which the respective active material layers are disposed in such way that the area of the negative electrode active material layer is larger than the area of the positive electrode active material layer, there is a portion of the periphery of the negative electrode active material layer in which the negative electrode active material layer and the positive electrode current collector face each other.

In such an electrode assembly, usually a separator is disposed between the positive electrode and the negative electrode, and hence, even in the periphery of the negative electrode active material layer, the negative electrode active material layer and the positive electrode current collector are not brought into direct contact with each other. However, in such an electrode assembly, when some abnormality causes the electrode assembly to generate heat to shrink the separator or some impact, for example, is applied to the electrode assembly to displace the separator in the electrode assembly, the negative electrode active material layer and the positive electrode current collector sometimes directly face each other without the separator therebetween. In such a case, when the negative electrode active material layer and the positive electrode current collector are brought into direct contact with each other, or for example, a conductive foreign substance is present in the electrode assembly, and the negative electrode active material layer and the positive electrode current collector are brought into contact with each other through the conductive foreign substance, there is a possibility that a short-circuit occurs between the negative electrode active material layer and the positive electrode current collector.

Also, in such an electrode assembly, there is a possibility that even when the separator is present, the conductive foreign substance penetrates the separator to cause a short-circuit between the negative electrode active material layer and the positive electrode current collector.

The short-circuit occurring between the negative electrode active material layer and the positive electrode current collector sometimes allows a relatively large current to flow. Accordingly, the electrode assembly is desired to be an electrode assembly capable of reducing the short-circuit current as a safety measure in the unlikely event that a short-circuit occurs between the negative electrode active material layer and the positive electrode current collector.

Patent Literature 3 describes an electrode assembly formed in such a way that the area of the negative electrode active material layer is larger than the area of the positive electrode active material layer, wherein the exposed portion, with no positive electrode active material layer formed thereon, of the positive electrode current collector is provided with an insulating layer.

In such an electrode assembly, the insulating layer can prevent the short-circuit between the negative electrode active material layer and the positive electrode current collector. However, the insulating layer of the electrode assembly described in Patent Literature 3 is an insulating layer provided in order to prevent the intercalation of the cations in the electrolyte solution into the negative electrode active material, and hence when the insulating layer is present on the portions other than the exposed portion, there is a possibility that the migration of the ions in the electrode is inhibited.

Accordingly, in such an electrode assembly, the insulating layer is required to be provided only on the exposed portion so as not to inhibit the necessary ionic conductivity in the electrode assembly. The provision of the insulating layer only on such a small exposed portion is a cumbersome work, and increases the number of the production steps. Accordingly, such an electrode assembly suffers from a problem such that the production of the electrode assembly takes time and labor.

CITATION LIST

Patent Literature

Patent Literature 1: Japanese Patent Application Laid-Open No. S62-160656
Patent Literature 2: Japanese Patent Application Laid-Open No. 2008-60060
Patent Literature 3: Japanese Patent Application Laid-Open No. 2009-199960
Patent Literature 4: Japanese Patent Application Laid-Open No. 2001-327906

SUMMARY

The following presents a simplified summary of the invention disclosed herein in order to provide a basic understanding of some aspects of the invention. The summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In view of the foregoing problem, an object of the present invention is to provide an electrode assembly in which even when a short-circuit occurs between the negative electrode active material layer in the vicinity of the periphery of the negative electrode active material layer and the positive electrode current collector, the short-circuit current can be suppressed, and additionally, which can be easily produced. Another object of the present invention is to provide an electric storage device including such an electrode assembly.

The present invention also takes as its yet another problem to be solved the provision of a method for producing an electrode assembly, capable of easily producing an electrode assembly in which even when a short-circuit occurs between the negative electrode active material layer in the vicinity of the periphery of the negative electrode active material layer and the positive electrode current collector, the short-circuit current can be suppressed.

The electrode assembly according to the present invention is an electrode assembly including:
a negative electrode including a negative electrode current collector and a negative electrode active material layer disposed on at least one surface of the negative electrode current collector;
a positive electrode including a positive electrode current collector, a positive electrode active material layer disposed on at least one surface of the positive electrode current collector, and an undercoat layer being disposed between the positive electrode current collector and the positive electrode active material layer and being higher in resistance value than the positive electrode current collector; and
a separator disposed between the negative electrode and the positive electrode,
wherein
the negative electrode and the positive electrode are stacked on each other with the separator therebetween in such a way that the negative electrode active material layer and the positive electrode active material layer face each other; and
in at least one side of the thus stacked negative and positive electrodes, the negative electrode active material layer projects from an edge of the positive electrode active material layer in a direction in which the negative and positive electrode current collectors extend, and the undercoat layer projects from an edge of the negative active material layer in the direction.

BRIEF DESCRIPTION OF DRAWINGS

The foregoing and other features of the present invention will become apparent from the following description and drawings of an illustrative embodiment of the invention in which:

FIG. 1 is a schematic view schematically illustrating parts of the cross sections of the electrode assembly of the present embodiment;

FIG. 2 is a schematic view schematically illustrating a part of a view of the electrode assembly of the present embodiment as viewed from the positive electrode.

DESCRIPTION OF EMBODIMENTS

Figure 3:
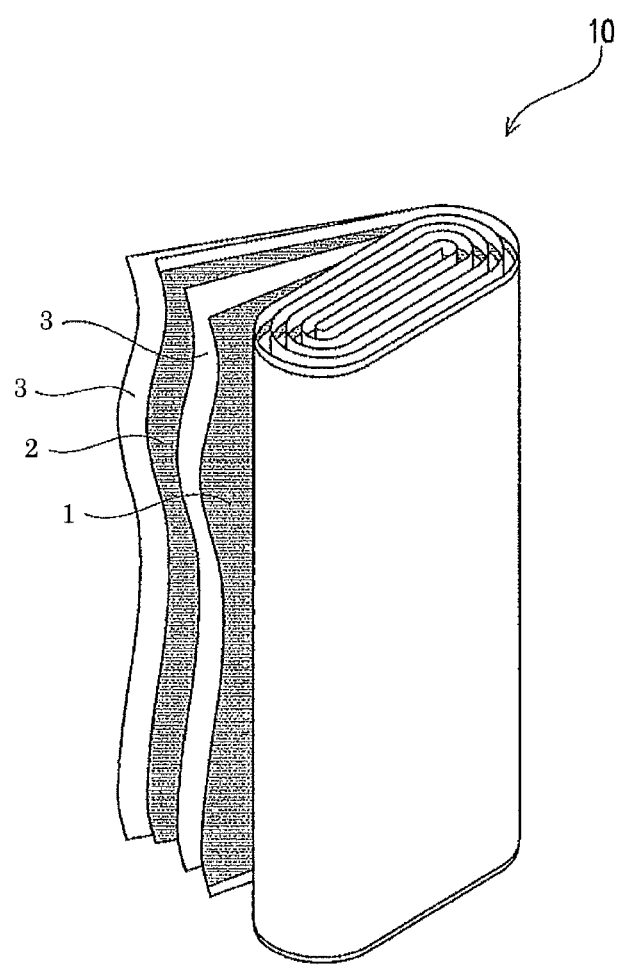
FIG. 3 is a schematic view illustrating the exterior appearance of the electrode assembly of the present embodiment.

The electrode assembly of the present embodiment is an electrode assembly including:
a negative electrode including a negative electrode current collector and a negative electrode active material layer disposed on at least one surface of the negative electrode current collector;
a positive electrode including a positive electrode current collector, a positive electrode active material layer disposed on at least one surface of the positive electrode current collector, and an undercoat layer being disposed between the positive electrode current collector and the positive electrode active material layer and being higher in resistance value than the positive electrode current collector; and
a separator disposed between the negative electrode and the positive electrode,
wherein
the negative electrode and the positive electrode are stacked on each other with the separator therebetween in such a way that the negative electrode active material layer and the positive electrode active material layer face each other; and
in at least one side of the thus stacked negative and positive electrodes in a direction along the layer surface, the negative electrode active material layer projects outwardly from an edge of the positive electrode active material layer in a direction in which the negative and positive electrode current collectors extend, and the undercoat layer projects outwardly from an edge of the negative active material layer in the direction in which the negative and positive electrode current collectors extend.

That is, according to the electrode assembly of the present embodiment, in at least a portion of the periphery of the negative electrode active material layer, the edge of the negative electrode active material layer is located outside the edge of the positive electrode active material layer of the positive electrode in a position thereof facing the negative electrode active material layer, in the positive electrode; and, in the at least a portion of the periphery of the negative electrode active material layer, the edge of the undercoat layer is located outside the edge of the negative electrode active material layer.

According to the electrode assembly of the present embodiment, in the periphery of the electrode assembly, there is a portion of the positive electrode, facing the negative electrode active material layer, in which the positive electrode active material layer is absent. In such a portion, the edge of the undercoat layer disposed on the surface of the positive electrode current collector is located outside the edge of the positive electrode active material layer.

In other words, in such a portion, the negative electrode active material layer and the positive electrode current collector face each other with the undercoat layer therebetween, the undercoat layer being higher in resistance value than the positive electrode current collector. Accordingly, for example, when in such a portion, the negative electrode and the positive electrode are brought into contact with each other through deformation or the like, or a conductive foreign substance intervenes between the negative electrode and the positive electrode, the negative electrode active material layer is connected to the positive electrode current collector through the undercoat layer. Whereby, even when a short-circuit occurs between the negative electrode active material and the positive electrode current collector, the presence of the undercoat layer allows the short-circuit current to be suppressed.

In such a portion, the undercoat layer is disposed in such a way that the edge of the undercoat layer is located outside the edge of the negative electrode active material layer. Accordingly, in the positive electrode in such a portion where no positive electrode active material is present, the resistance value is made higher by the amount corresponding to the presence of the undercoat layer.

Moreover, in such a portion, the edge of the undercoat layer is located outside the edge of the negative electrode active material layer, and hence even in the case where the positive electrode and the negative electrode are slightly displaced, when the displacements fall within the range of the length of the portion located outside, the undercoat layer can be disposed at a position facing the edge of the negative electrode active material layer.

Here, "the undercoat layer" has a resistance value of a level not to inhibit the conductivity between the positive electrode current collector and the positive electrode active material layer.

As an aspect of the electrode assembly of the present embodiment, it is possible to adopt an electrode assembly in which the resistance value of the undercoat layer is 5 Ω/square or more and 200 Ω/square or less.

The resistance value of the undercoat layer falling within the foregoing range allows the current between the negative electrode active material layer and the positive electrode current collector at the time of short-circuit to be more certainly suppressed, while not inhibiting the conductivity between the positive electrode current collector and the positive electrode active material layer.

The electrode assembly of the present embodiment can suppress the short-circuit current even when a short-circuit occurs between the negative electrode active material layer and the positive electrode current collector in the periphery of the negative electrode active material layer, and also achieves an effect of being easily produced.

Hereinafter, an embodiment of the electrode assembly, the electric storage device and the method for producing the electrode assembly of the present invention is described in detail.

First, the electrode assembly of the present embodiment is described with reference to FIG. 1 to FIG. 3.

As shown in FIG. 3, the electrode assembly 10 of the present embodiment includes a negative electrode 1, a positive electrode 2, and a separator 3 disposed between the negative electrode 1 and the positive electrode 2.

The negative electrode 1 includes a negative electrode current collector 11 and a negative electrode active material layer 12 disposed on at least one surface of the negative electrode current collector 11.

The positive electrode 2 includes a positive electrode current collector 21, a positive electrode active material layer 22 disposed on at least one surface of the positive electrode current collector 21 and an undercoat layer 23 being disposed between the positive electrode current collector 21 and the positive electrode active material layer 22 and being higher in resistance value than the positive electrode current collector 21.

Specifically, as shown in FIG. 1 and FIG. 2, the electrode assembly 10 of the present embodiment is an electrode assembly including:

a negative electrode 1 including a negative electrode current collector 11 and a negative electrode active material layer 12 disposed on at least one surface of the negative electrode current collector 11;

a positive electrode 2 including a positive electrode current collector 21, a positive electrode active material layer 22 disposed on at least one surface of the positive electrode current collector 21, and an undercoat layer 23 being disposed between the positive electrode current collector 21 and the positive electrode active material layer 22 and being higher in resistance value than the positive electrode current collector 21; and a separator 3 disposed between the negative electrode 1 and the positive electrode 2, wherein the negative electrode 1 and the positive electrode 2 are stacked on each other with the separator therebetween in such a way that the negative electrode active material layer 12 and the positive electrode active material layer 22 face each other; and in at least portions of the peripheries of the negative electrode 1 and the positive electrode 2 facing each other, the edge 12a of the negative electrode active material layer 12 is located outside the edge 22a of the positive electrode active material layer 22 in the facing positive electrode 2, and the edge 23a of the undercoat layer 23 in the positive electrode 2 is located outside the edge 12a of the negative electrode active material layer 12.

The electrode assembly 10 of the present embodiment is used, for example, as the electrode assembly for an electric storage device. The electrode assembly 10 of the present embodiment is suitable as the electrode assembly for a nonaqueous electrolyte secondary cell. In particular, the electrode assembly 10 of the present embodiment is suitable as the electrode assembly for a lithium-ion battery cell.

The electrode assembly 10 includes a sheet-shaped positive electrode 2, a sheet-shaped separator 3 and a sheet-shaped negative electrode 1.

The electrode assembly 10 can be formed into a cylinder-like shape by winding the sheet-shaped members, for example, under the conditions that the separator 3 is disposed on the positive electrode 2, the negative electrode 1 is disposed on the separator 3, and another sheet of the separator 3 is disposed on the negative electrode 1.

In the electrode assembly 10, the insulating separator 3 is disposed between the positive electrode 2 and the negative electrode 1, and hence the positive electrode 2 and the negative electrode 1 are not electrically connected to each other.

The negative electrode 1 includes the sheet-shaped negative electrode current collector 11 and the sheet-shaped negative electrode active material layer 12 disposed on at least one surface of the negative electrode current collector 11.

For example, as shown in FIG. 1, the negative electrode active material layer 21 is disposed on each of both surfaces of the negative electrode current collector 11.

Examples of the negative electrode current collector 11 include a metal foil such as a belt-shaped copper foil.

The thickness of the negative electrode current collector 11 is preferably 4 to 20 μm.

To the surface of the negative electrode current collector 11 on which the negative electrode active material layer 12 is disposed (both surfaces in the case of the present embodiment), a coupling treatment or other surface treatments may be applied in order to improve the adhesiveness with the negative electrode active material layer 12.

The negative electrode current collector 11 may have on such a surface an adhesive layer to improve the adhesiveness between the negative electrode current collector and the negative electrode active material layer.

The negative electrode active material layer 12 includes a powdery negative electrode active material.

The negative electrode active material layer 12 is formed, for example, by applying to the negative electrode current collector 11 a paste-like mixture prepared by mixing with the powdery negative electrode active material, if necessary, optional components such as a binder, a conductive agent, a thickener and a filler.

When the electrode assembly is for use in lithium-ion battery cells, examples of the negative electrode active material include metallic lithium and lithium alloys (e.g., lithium metal-containing alloys such as lithium-aluminum, lithium-lead, lithium-tin, lithium-aluminum-tin and lithium-gallium alloys, and Wood's alloy).

Examples of the negative electrode active material include alloys capable of occluding and releasing lithium, carbon materials (such as graphite, hard carbon, low temperature fired carbon and amorphous carbon), metal oxides, lithium metal oxides (such as $Li_4Ti_5O_{12}$) and polyphosphate compounds.

The negative electrode active material is preferably, for example, carbon materials such as graphite, hard carbon, low temperature fired carbon and amorphous carbon; metal oxides; lithium metal oxides (such as $Li_4Ti_5O_{12}$) and polyphosphate compounds, in view of the easiness in application of the mixture to the negative electrode current collector.

The average particle size d50 of the powdery negative electrode active material is preferably 1 to 20 μm. In order to obtain a powder having a predetermined average particle size or a powder having a predetermined shape, for example, heretofore known pulverizers or classifiers can be used.

The positive electrode 2 includes a sheet-shaped positive electrode current collector 21, a sheet-shaped positive electrode active material layer 22 disposed on at least one surface of the positive electrode current collector 21 and an undercoat layer 23 being disposed between the positive electrode current collector 21 and the positive electrode active material layer 22 and being higher in resistance value than the positive electrode current collector 21.

For example, as shown in FIG. 1, the positive electrode active material layer 22 is disposed on each of both surfaces of the positive electrode current collector 21.

Examples of the positive electrode current collector 21 include a belt-shaped metal foil such as an aluminum foil. The thickness of the positive electrode current collector 21 is preferably 5 to 30 μm.

The undercoat layer 23 is formed, for example, by applying an under-coating agent to the surface of the positive electrode current collector 21.

The under-coating agent is not particularly limited as long as the under-coating agent is higher in resistance value than the positive electrode current collector 21, and has such properties that can improve the adhesiveness between the positive electrode current collector 21 and the positive electrode active material layer 22.

Examples of the undercoating agent include an agent including a binder and a conductive aid.

Examples of the binder include polyvinylidene fluoride, styrene-butadiene rubber and chitosan.

The conductive aid is not particularly limited as long as the conductive aid is a conductive material; examples of the conductive aid include carbon black (carbonaceous fine particle) such as acetylene black or Ketjen black, or conductive carbon materials such as carbon fiber.

The resistance value of the undercoat layer 23 is preferably 5 Ω/square or more and 200 Ω/square or less. Such a range of the resistance value allows the short-circuit current to be more certainly suppressed while the conductivity between the positive electrode current collector 21 and the positive electrode active material layer 22 is being maintained, even when a short-circuit occurs between the negative electrode active material layer 12 and the positive electrode current collector 21.

The resistance value of the undercoat layer 23 falls within the foregoing range, and is preferably 10 to 10000 times and more preferably 10 to 1000 times as large as the resistance value of the positive electrode current collector 21.

The thickness of the undercoat layer 23 is preferably 1 to 3 μm. Such a range of the thickness allows the adhesiveness between the positive electrode current collector 21 and the positive electrode active material layer 22 to be improved. Moreover, even when a short-circuit occurs in the portion in which the positive electrode active material layer 22 is absent, such a range of the thickness allows the short-circuit current to be more certainly suppressed.

To the surface of the positive electrode current collector 21 on which the undercoat layer 23 is disposed, a coupling treatment or other surface treatments may be applied.

The positive electrode active material layer 22 includes a powdery positive electrode active material.

The positive electrode active material layer 22 is formed, for example, by applying on the undercoat layer 23 a paste-like mixture prepared by mixing with the powdery positive electrode active material, if necessary, optional components such as a binder, a conductive agent, a thickener and a filler.

When the electrode assembly is for use in lithium-ion battery cells, the positive electrode active material is not particularly limited as long as the positive electrode active material is a compound capable of occluding and releasing lithium.

Examples of the positive electrode active material include composite oxides (such as $Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$ and $Li_xNi_yMn_{(2-y)}O_4$) represented by $Li_xMO_y$ (M represents at least one type of transition metal.).

Examples of the positive electrode active material also include polyanionic compounds ($LiFePO_4$, $LiMnPO_4$, $LiNiPO_4$, $LiCoPO_4$, $Li_3V_2(PO_4)_3$, $Li_2MnSiO_4$ and $Li_2CoPO_4F$) represented by $Li_wMe_x(XO_y)_z$ (Me represents at least one type of transition metal, and X represents, for example, P, Si, B and V.).

The elements or polyanions in these compounds may be partially replaced with other elements or other anionic species.

Examples of the positive electrode active material further include: conductive polymer compounds such as disulfide, polypyrrole, polyaniline, polyparastyrene, polyacetylene and polyacene based materials; and carbonaceous materials having a pseudo-graphite structure.

In the positive electrode active material, these compounds may be used each alone or as combinations of two or more thereof.

In the electrode assembly 10 of the present embodiment, the separator 3 is disposed between the negative electrode 1 and the positive electrode 2. The separator 3 insulates the negative electrode 1 and the positive electrode 2 from each other.

The separator 3 is appropriately selected from among heretofore known separators to be used.

Examples of the separator include woven fabric, nonwoven fabric and porous synthetic resin films.

When the electrode assembly is an electrode assembly for use in nonaqueous electrolyte cells, examples of the material constituting the separator include: polyolefin resins typified by polyethylene and polypropylene; polyester resins typified by polyethylene terephthalate and polybutylene terephthalate; and fluorine-based resins such as polyvinylidene fluoride, vinylidene fluoride-hexafluoropropylene copolymer, vinylidene fluoride-perfluorovinyl ether copolymer, vinylidene fluoride-tetrafluoroethylene copolymer, vinylidene fluoride-trifluoroethylene copolymer, vinylidene fluoride-fluoroethylene copolymer, vinylidene fluoride-hexafluoroacetone copolymer, vinylidene fluoride-ethylene copolymer, vinylidene fluoride-propylene copolymer, vinylidene fluoride-trifluoropropylene copolymer, vinylidene fluoride-tetrafluoroethylene-hexafluoropropylene copolymer and vinylidene fluoride-ethylene-tetrafluoroethylene copolymer.

In the electrode assembly 10 of the present embodiment, the negative electrode 1 and the positive electrode 2 are stacked on each other with the separator 3 therebetween in such a way that the negative electrode active material layer 12 and the positive electrode active material layer 22 face each other with the separator 3 therebetween.

Specifically, in the periphery of the electrode assembly 10 in which the belt-shaped negative electrode 1 and the belt-shaped positive electrode 2 face each other, as shown in FIG. 1 and FIG. 2, on one end in the width direction (namely, the sides S of the negative electrode current collector 11 and the positive electrode current collector 21 each having a lengthy rectangular shape), the edge 12a of the negative electrode active material layer 12 is located a length of X outside the edge 22a of the positive electrode active material layer 22 in the facing positive electrode 2. Moreover, the edge 23a of the undercoat layer 23 is located a length of Y outside the edge 12a of the negative electrode active material layer 12.

In other words, in the positive electrode 2, the edge 23a of the undercoat layer 23 is located a length of X+Y outside the edge 22a of the positive electrode active material layer 22.

The length X from the edge 12a of the negative electrode active material layer 12 to the edge 22a of the positive electrode active material layer 22 is preferably set to be as short as possible.

Similarly, the length Y from the edge 23a of the undercoat layer 23 to the edge 12a of the negative electrode active material layer 12 is preferably set to be as short as possible.

As described above, in the electrode assembly 10 of the present embodiment, the edge 12a of the negative electrode active material layer 12 is located the length of X outside the edge 22a of the positive electrode active material layer 22 in the facing positive electrode 2. Accordingly, between the edge 12a of the negative electrode active material layer 12 and the edge 22a of the positive electrode active material layer 22, the negative electrode active material layer 12 and the undercoat layer 23 disposed on the positive electrode current collector 21 face each other with the separator 3 therebetween.

Consequently, for example, even when an abnormal heat generation occurs in the electrode assembly 10 and thus the separator 3 is shrunk to cause the separator 3 itself to be absent between the edge 12a of the negative electrode active material layer 12 and the edge 22a of the positive electrode active material layer 22, the undercoat layer 23 prevents the direct contact of the negative electrode active material layer 12 and the positive electrode current collector 21 with each other. Accordingly, even when a short-circuit occurs between the negative electrode active material layer 12 and the positive electrode current collector 21, the short-circuit current is suppressed.

In the case where a conductive foreign substance C is incorporated in the electrode assembly 10, even when a state is caused in which the negative electrode active material layer 12 and the positive electrode current collector 21 can be connected for some reason through the conductive foreign substance C, the intervention of the undercoat layer 23 suppresses the short-circuit current.

Even when the separator 3 is present, the penetration of the conductive foreign substance C through the separator 3 may cause an abnormal condition that the conductive foreign substance C allows the negative electrode active material layer 12 and the positive electrode current collector 21 to be connected to each other. However, the intervention of the undercoat layer 23 between the negative electrode active material layer 12 and the positive electrode current collector 21 suppresses the short-circuit current between the negative electrode active material layer 12 and the positive electrode current collector 21.

The electrode assembly 10 of the present embodiment has a structure in which at one end in the width direction (a side S of the lengthy rectangular shape) before winding, the edge 23a of the undercoat layer 23 is located the length of Y outside the edge 12a of the negative electrode active material layer 12.

Because of such a structure, in the electrode assembly 10 of the present embodiment, even in the case where the negative electrode and the positive electrode are slightly displaced, when the displacements are smaller than the distance Y from the edge 23a of the undercoat layer 23 to the edge 12a of the negative electrode active material layer 12, the undercoat layer 23 prevents the direct connection of the negative electrode active material layer 12 and the positive electrode current collector 21 to each other.

The foregoing displacements are caused, for example, when the negative electrode and the positive electrode are stacked at the time of production, when the negative electrode and the positive electrode are wound at the time of production, or when after the production, some force is exerted to the negative electrode and the positive electrode stacked on each other.

Next, the electric storage device of the present embodiment is described. The electric storage device of the present embodiment includes the foregoing electrode assembly 10.

Specifically, the electric storage device of the present embodiment includes an electrode assembly 10 including a negative electrode 1, a positive electrode 2 and a separator 3 disposed between the negative electrode 1 and the positive electrode 2, wherein the negative electrode 1 includes a negative electrode current collector 11 and a negative electrode active material layer 12 disposed on at least one surface of the negative electrode current collector 11; and the positive electrode 2 includes a positive electrode current collector 21, a positive electrode active material layer 22 disposed on at least one surface of the positive electrode current collector 21, and an undercoat layer 23 disposed between the positive electrode current collector 21 and the positive electrode active material layer 22 and being higher in resistance value than the positive electrode current collector 21;

in the electrode assembly 10, the negative electrode 1 and the positive electrode 2 are stacked on each other with the separator 3 therebetween in such a way that the negative electrode active material layer 12 and the positive electrode active material layer 22 face each other; and in the electrode assembly 10, in at least one side of the thus stacked negative and positive electrodes 1 and 2 in a direction along the layer surface, the negative electrode active material layer 12 projects outwardly from an edge 22a of the positive electrode active material layer 22 in a direction in which the negative and positive electrode current collectors 11 and 21 extend, and the undercoat layer 23 projects outwardly from an edge 12a of the negative active material layer 12 in the aforesaid direction.

That is, in the electrode assembly 10, in at least a portion of the periphery of the negative electrode active material layer 12, the edge of the negative electrode active material layer 12 is located outside the edge of the positive electrode active material layer 22 of the positive electrode 2 in a position thereof facing the negative electrode active material layer 12, and, in the at least a portion of the periphery of the negative electrode active material layer 12, the edge of the undercoat layer 23 is located outside the edge of the negative electrode active material layer 12.

The electric storage device of the present embodiment achieves an effect such that even when in the electrode assembly, a short-circuit occurs between the negative electrode active material layer in the vicinity of the periphery of the negative electrode active material layer and the positive electrode current collector, the short-circuit current can be suppressed, and additionally, achieves an effect such that the electrode assembly can be easily produced.

Examples of the electric storage device include cells or capacitors. Hereinafter, as an example of the electric storage device, a nonaqueous electrolyte secondary cell is quoted, and such a nonaqueous electrolyte secondary cell is described with reference to the accompanying drawings.

Figure 4:
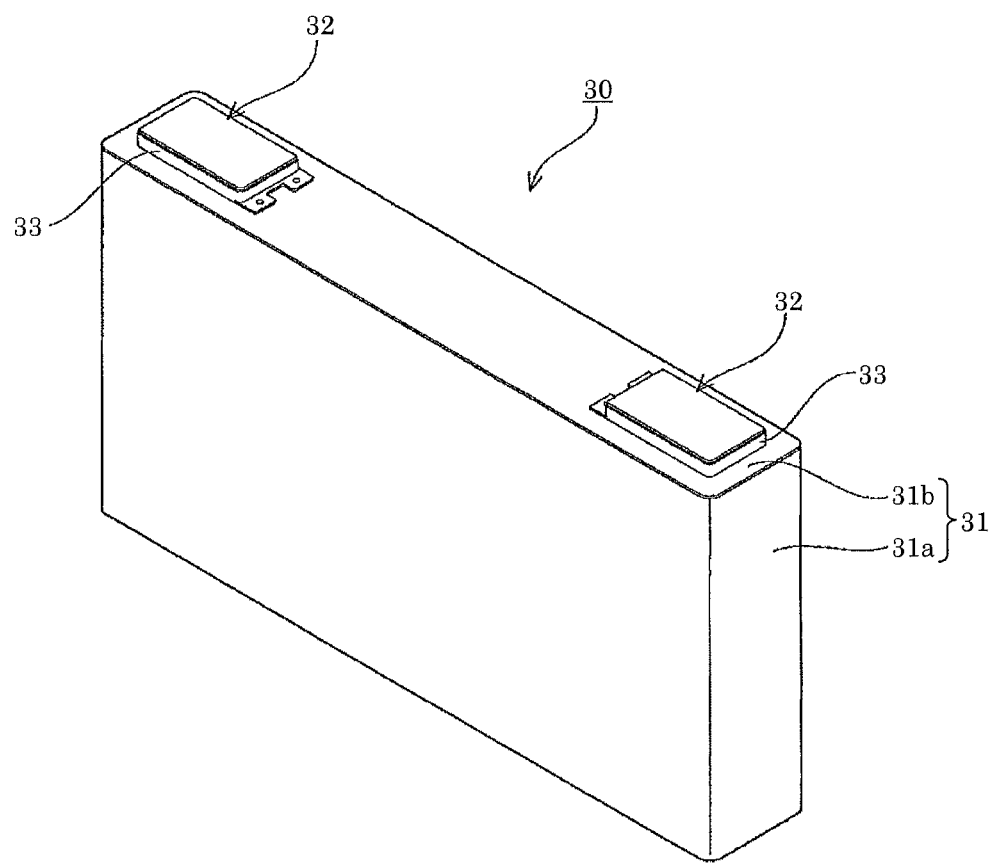
FIG. 4 is a schematic view illustrating the exterior appearance of the electric storage device of the present embodiment.
Figure 5:
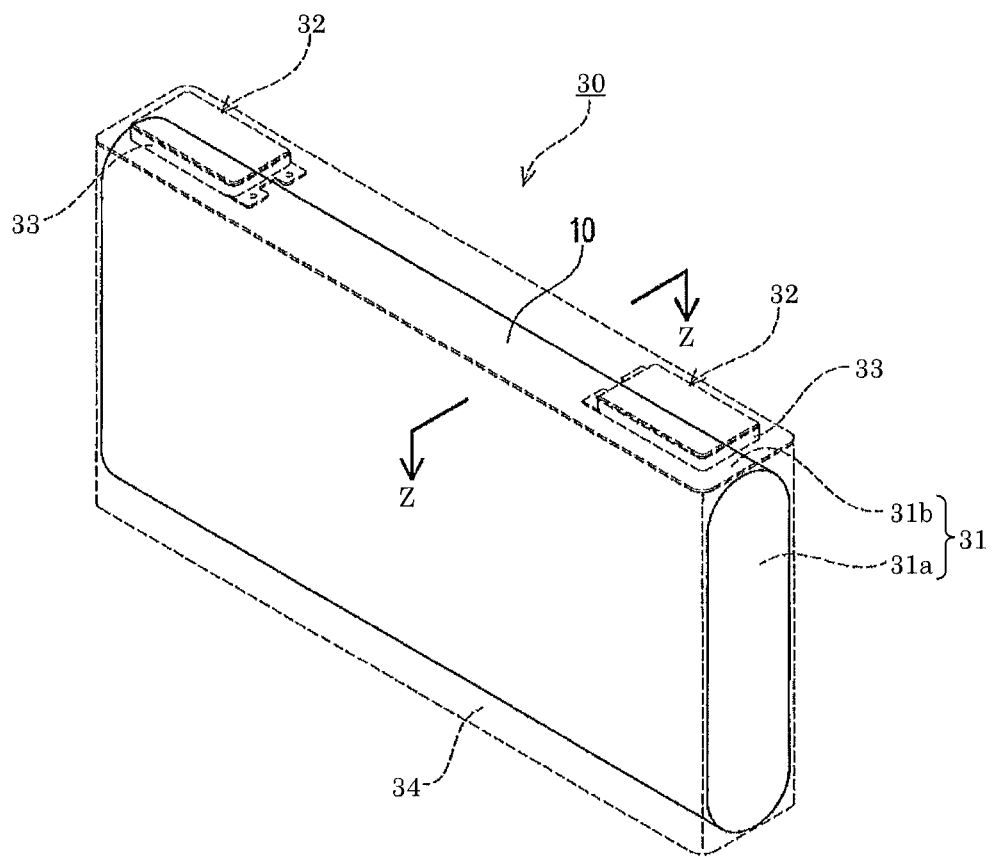
FIG. 5 is a schematic view illustrating the interior of the electric storage device of the present embodiment.
Figure 6:
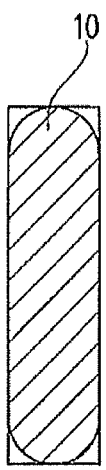
FIG. 6 is a cross-sectional view schematically illustrating the Z-Z cross section in FIG. 5.

As shown in FIGS. 4 to 6, the nonaqueous electrolyte secondary cell 30 includes a case 31, the electrolyte solution (electrolyte)) 34 housed in the case 31, the external gaskets 33 fitted to the case 31, the electrode assembly 10 housed in the case 31 and the external terminals 32 electrically connected to the electrode assembly 10.

As shown in FIG. 4, the case 31 has a case body 31a having an opening opening toward one side and housing the electrode assembly 10, and a cover 31b closing the opening of the case body 31a.

The case body 31a and the cover 31b are formed of an aluminum-based metal material such as aluminum or an aluminum alloy, or a stainless steel plate, and are welded to each other.

The cover 31b has two openings formed thereon. On the external surface of the cover 31b, external gaskets 33 being formed of an insulating material and having the openings formed thereon are fitted.

The openings of the cover 31b and the openings of the external gaskets 33 are communicatively connected to each other. On the inside of the opening of each of the external gaskets 33, a part of an external terminal 32 is disposed.

The external terminals 32 each have a protrusion passing through the opening of the external gasket 33 and the opening of the cover 31b and projecting into the inside of the case body 31a. The external terminal 32 is formed of an aluminum-based metal material such as aluminum or an aluminum alloy.

The external terminals 32 are connected to the current collecting sections disposed inside the case 31. The current collecting sections are connected to the electrode assembly 10. In other words, each of the external terminals 32 and the electrode assembly 10 are connected to each other through the corresponding current collecting section inside the case 31. The shapes of the current collecting sections are not particularly limited, and are, for example, plate-like shapes.

The external gaskets 33 are disposed respectively to be used for the positive electrode and the negative electrode, and the external terminals 32 are also disposed respectively to be used for the positive electrode and the negative electrode.

As shown, for example, in FIG. 4, the external gasket 33 and the external terminal 32 for the positive electrode are disposed on one end in the lengthwise direction of the cover 31b, and the external gasket 33 and the external terminal 32 for the negative electrode are disposed on the other end in the lengthwise direction of the cover 31b.

As shown in FIG. 5, inside the case body 31a, the electrolyte solution 34 is housed and the electrode assembly 10 is immersed in the electrolyte solution 34. In other words, the electrode assembly 10 and the electrolyte solution 34 are enclosed and hermetically sealed inside the case body 31a.

The electrolyte solution 34 as a nonaqueous electrolyte is prepared by dissolving an electrolyte salt in an organic solvent.

Examples of the organic solvent include the following nonaqueous solvents: ethylene carbonate, propylene carbonate, butylene carbonate, trifluoropropylene carbonate, γ-butyrolactone, γ-valerolasctone, sulfolane, 1,2-dimethoxyethane, 1,2-diethoxyethane, tetrahydrofuran, 2-methyltetrahydrofuran, 2-methyl-1,3-dioxolane, dioxolane, fluoroethyl methyl ether, ethylene glycol diacetate, propylene glycol diacetate, ethylene glycol dipropionate, propylene glycol dipropionate, methyl acetate, ethyl acetate, propyl acetate, butyl acetate, methyl propionate, ethyl propionate, propyl propionate, dimethyl carbonate, diethyl carbonate, ethyl methyl carbonate, methyl propyl carbonate, ethyl propyl carbonate, dipropyl carbonate, methyl isopropyl carbonate, ethyl isopropyl carbonate, diisopropyl carbonate and dibutyl carbonate; acetonirile and fluoroacetonirile; alkoxy- and halogen-substituted cyclic phosphazenes such as ethoxy pentafluoro cyclotriphosphazene, diethoxy tetrafluoro cyclotriphosphazene and phenoxy pentafluoro cyclotriphazene; the chain-like phosphazenes; phosphoric acid esters such as triethyl phosphate, trimethyl phosphate and trioctyl phosphate; boric acid esters such as triethyl borate and tributyl borate; and N-methyloxazolidinone and N-ethyloxazolidinone.

When a solid electrolyte is used as the electrolyte, a solid polymer electrolyte as a solid electrolyte is used, and a porous solid polymer electrolyte can be used as the solid polymer electrolyte. And, the solid polymer electrolyte can be made to further contain an electrolyte solution.

Alternatively, when a gel-like solid polymer electrolyte is used as the electrolyte, the electrolyte solution constituting the gel and the electrolyte solution included, for example, in the pores may be different from each other. However, when a high output power is required, for example, in the HEV application, a nonaqueous electrolyte is preferably used alone rather than using a solid electrolyte or a solid polymer electrolyte.

The electrolyte salt is not particularly limited; examples of the electrolyte salt include: ionic compounds such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, $Li_2B_{10}Cl_{10}$, $NaClO_4$, NaI, NaSCN, NaBr, $KClO_4$ and KSCN; and the mixtures composed of two or more of these ionic compounds.

The nonaqueous electrolyte may also include heretofore known additives.

The nonaqueous electrolyte secondary cell 30 can adopt the nonaqueous electrolytes prepared by combining the foregoing organic solvents and the foregoing electrolyte salts with each other.

As the nonaqueous electrolyte, the nonaqueous electrolytes prepared by mixing propylene carbonate, dimethyl carbonate and methyl ethyl carbonate is preferable in that the conductance of lithium ion is increased.

As shown in FIG. 5 and FIG. 6, the electrode assembly 10 is housed inside the case body 31a. Inside the case 31, one electrode assembly may be housed, or alternatively, a plurality of electrode assemblies may also be housed. In the latter case, the plurality of electrode assemblies 10 are electrically parallel-connected.

Next, the method for producing the electrode assembly of the present embodiment is described.

The method for producing an electrode assembly of the present embodiment is a method including:

an electrode plate forming step, which includes forming a negative electrode by disposing a negative electrode active material layer on at least one surface of a negative electrode current collector, and forming a positive electrode by disposing a positive electrode active material layer on at least one surface of a positive electrode current collector and by disposing an undercoat layer, which is higher in resistance value than the positive electrode current collector, between the positive electrode current collector and the positive electrode active material layer; and a stacking step of disposing a separator between the negative electrode and the positive electrode and stacking the negative electrode and the positive electrode on each other with the separator therebetween in such a way that the negative electrode active material layer and the positive electrode active material layer face each other, wherein in the electrode plate forming step, the negative electrode active material layer is disposed in such a way that, in at least one side of the negative and positive electrodes (to be stacked) in a direction along the layer surface, the negative electrode active material layer projects outwardly from an edge of the positive electrode active material layer in a direction in which the negative and positive electrode current collectors extend, and the undercoat layer projects outwardly from an edge of the negative active material layer in the direction.

That is, in the electrode plate forming step, the negative electrode active material layer and the positive electrode active material layer are disposed in such a way that in at least portions of the peripheries of the negative electrode and the positive electrode facing each other, the edge of the negative electrode active material layer is located outside the edge of the positive electrode active material layer in the positive electrode which faces to the negative electrode when stacked, and the undercoat layer is disposed in such a way that the edge of the undercoat layer is located outside the edge of the negative electrode active material layer.

The method for producing an electrode assembly of the present embodiment achieves an effect such that it is possible to easily produce an electrode assembly in which even when a short-circuit occurs between the negative electrode active material layer in the vicinity of the periphery of the negative electrode active material layer and the positive electrode current collector, the short-circuit current is suppressed.

(Electrode Plate Forming Step)

In the electrode plate forming step, the negative electrode and the positive electrode are formed.

In the formation of the negative electrode, for example, to the surface (both surfaces in the present embodiment) of the negative electrode current collector, a mixture prepared by mixing a negative electrode active material and a binder with each other is applied with a heretofore known application device such as a die head coater. Subsequently, a negative electrode active material layer is formed with heretofore known operations such as drying and pressing. Thus, the negative electrode is formed.

In the formation of the positive electrode, for example, to the surface (both surfaces in the present embodiment) of the positive electrode current collector, an under-coating agent is applied with a heretofore known application method such as gravure coating. Subsequently, the applied coating agent is dried to produce the undercoat layer. Additionally, a mixture prepared by mixing the ingredients such as a positive electrode active material, a binder and a conductive aid is applied to the surface of the undercoat layer with a heretofore known application device such as a die head coater. Successively, a positive electrode active material layer is prepared with heretofore known operations such as drying and pressing. Thus, the positive electrode is formed.

In the electrode plate forming step, when the negative electrode and the positive electrode are stacked on each other in the stacking step described below, the negative electrode active material layer, the positive electrode active material layer and the undercoat layer are disposed as follows.

Specifically, the negative electrode active material layer and the positive electrode active material layer are disposed in such a way that in at least a portion of the periphery of the electrode assembly, the edge of the negative electrode active material layer is located outside the edge, facing the edge of the negative electrode active material layer at the time of lamination, of the positive electrode active material layer in the positive electrode. Moreover, the undercoat layer is disposed in such a way that the edge of the undercoat layer is located outside the edge of the negative electrode active material layer.

Specifically, in the electrode plate forming step, for example, when a mixture for the negative electrode active material layer is applied to a belt-shaped (rectangle shaped) negative electrode current collector, the mixture for the negative electrode active material is applied in such a way that the edge of the negative electrode active material layer on one side of the negative electrode current collector is located a predetermined length, namely, the length X in FIG. 1 outside the edge, facing the edge of the negative electrode active material layer at the time of lamination, of the positive electrode active material layer of the positive electrode.

On the other hand, when the under-coating agent is applied to the positive electrode current collector, the undercoating agent is applied in such a way that the edge of the undercoat layer facing the negative electrode at the time of stacking the positive electrode and the negative electrode on each other is located a predetermined length, namely, the length Y in FIG. 1 outside the edge of the negative electrode active material layer. And, a mixture for the positive electrode active material is further applied to the surface of the undercoat layer. In this case, the mixture for the positive electrode active material layer is applied in such a way that the undercoat layer is exposed by a predetermined length, namely, by the length X+Y shown in FIG. 1 from the edge of the positive electrode active material layer.

In the electrode plate forming step, it is preferable to beforehand set the application areas or the application portions of the mixture for the negative electrode active material layer, the mixture for the positive electrode active material layer and the under-coating agent. Specifically, it is preferable to beforehand set the application areas or the application portions in such a way that the edge of the negative electrode active material layer, the edge of the positive electrode active material layer and the edge of the undercoat layer satisfy the foregoing positional relationships.

(Stacking Step)

In the stacking step, between the negative electrode and the positive electrode, the separator is disposed so as to insulate the negative electrode and the positive electrode from each other. And, the negative electrode and the positive electrode are stacked on each other in such a way that the negative electrode active material layer and the positive electrode active material layer face each other with the separator therebetween.

In the method for producing an electrode assembly of the present embodiment, after the negative electrode and the positive electrode are stacked on each other, the resulting stacked product may further be wound.

When the stacked negative electrode and positive electrode are wound, a winding displacement in which the negative electrode and the positive electrode are slightly displaced from each other may occur in the periphery of the produced electrode assembly. Even in the case where such a winding displacement occurs, because of setting the predetermined length Y from the edge of the undercoat layer to the edge of the negative electrode active material layer, when the length of the displacement is less than Y, the undercoat layer intervenes between the negative electrode active material layer and the positive electrode current collector.

Accordingly, even when such a short-circuit as described above occurs, the current increase at the time of short-circuit is suppressed by the undercoat layer.

The electrode assembly of the present embodiment produced as described above is housed, for example, further in a cell case. Then, in the cell case, the nonaqueous electrolyte is further placed. Thus, the nonaqueous electrolyte cell (for example, lithium-ion battery cell) as an electric storage device is produced.

According to the method for producing an electrode assembly of the present embodiment, the undercoat layer is disposed between the positive electrode current collector and the positive electrode active material layer, and hence the adhesiveness between the positive electrode current collector and the positive electrode active material layer can be improved.

Additionally, according to the production method, the undercoat layer can be formed by applying the undercoating agent so as to be exposed from the positive electrode active material layer. The undercoat layer also allows a portion relatively higher in resistance value to be formed on the surface of the positive electrode current collector. Consequently, by the relatively simple production steps, it is possible to easily produce an electrode assembly in which the increase of the current at the time of short-circuit can be suppressed.

In the present embodiment, a description is made by quoting as an example an aspect in which only on one side of the belt-shaped (rectangle shaped) electrode assembly, the respective edges (the edge of the negative electrode active material layer, the edge of the positive electrode active material layer and the edge of the undercoat layer) are located as described above; however, the present invention is not limited to such an aspect.

For example, the present invention also includes an aspect in which in the whole periphery of the electrode assembly, the edge of the negative electrode active material layer is located outside the edge, facing the foregoing edge, of the positive electrode active material layer in the positive electrode, and the edge of the undercoat layer is located outside the edge of the negative electrode active material layer.

The electrode assembly, the electric storage device and the method for producing an electrode assembly of the present embodiment are configured as described above, but the present invention is not limited to the foregoing embodiment, and can be appropriately modified with respect to the design thereof within the intended scope of the present invention. The operational advantage of the present invention is also not limited to the foregoing embodiment.

In other words, the embodiment disclosed herein should be construed in all respects as illustrative but not limiting. The scope of the present invention is not indicated by the foregoing description but by the scope of the claims. The scope of the present invention is intended to include all the modifications equivalent in the sense and the scope to the scope of the claims.

What is claimed is:

1. An electrode assembly comprising:
   a belt-shaped negative electrode including a negative electrode current collector and a negative electrode active material layer disposed on at least one surface of the negative electrode current collector;
   a belt-shaped positive electrode including a positive electrode current collector, a positive electrode active material layer disposed on at least one surface of the positive electrode current collector, and an undercoat layer being disposed between the positive electrode current collector and the positive electrode active material layer and being higher in resistance value than the positive electrode current collector, the undercoat layer comprising a conductive aid; and a separator disposed between the negative electrode and the positive electrode, wherein the negative electrode and the positive electrode are stacked on each other with the separator therebetween in such a way that the negative electrode active material layer and the positive electrode active material layer face each other; and in one end in a width direction of the thus stacked negative and positive electrodes, the negative electrode active material layer projects from an edge of the positive electrode active material layer in a direction in which the negative and positive electrode current collectors extend, the undercoat layer projects from an edge of the negative active material layer in the direction, the negative and positive electrode current collectors project from an outermost edge of the undercoat layer in the direction, the outermost edge of the undercoat layer projecting from the edge of the negative active material layer overlaps an exposed portion of the negative electrode current collector, no negative electrode active material layer being disposed on the exposed portion.

2. The electrode assembly according to claim 1, wherein the resistance value of the undercoat layer is 5 Ω/square or more and 200 Ω/square or less.

3. An electric storage device comprising an electrode assembly including a belt-shaped negative electrode, a belt-shaped positive electrode and a separator disposed between the negative electrode and the positive electrode, wherein the negative electrode includes a negative electrode current collector and a negative electrode active material layer disposed on at least one surface of the negative electrode current collector; and the positive electrode includes a positive electrode current collector, a positive electrode active material layer disposed on at least one surface of the positive electrode current collector, and an undercoat layer disposed between the positive electrode current collector and the positive electrode active material layer and being higher in resistance value than the positive electrode current collector, the undercoat layer comprising a conductive aid;

in the electrode assembly, the negative electrode and the positive electrode are stacked on each other with the separator therebetween in such a way that the negative electrode active material layer and the positive electrode active material layer face each other; and in the electrode assembly, in one end in a width direction of the thus stacked negative and positive electrodes, the negative electrode active material layer projects from an edge of the positive electrode active material layer in a direction in which the negative and positive electrode current collectors extend, the undercoat layer projects from an edge of the negative active material layer in the direction, the negative and positive electrode current collectors project from an outermost edge of the undercoat layer in the direction, and the outermost edge of the undercoat layer projecting from the edge of the negative active material layer overlaps an exposed portion of the negative electrode current collector, no negative electrode active material layer being disposed on the exposed portion.

4. A method for producing an electrode assembly, comprising:

an electrode plate forming step, which includes forming a belt-shaped negative electrode by disposing a negative electrode active material layer on at least one surface of a negative electrode current collector, and forming a belt-shaped positive electrode by disposing a positive electrode active material layer on at least one surface of a positive electrode current collector and by disposing an undercoat layer, which is higher in resistance value than the positive electrode current collector, between the positive electrode current collector and the positive electrode active material layer, the undercoat layer comprising a conductive aid; and a stacking step of disposing a separator between the negative electrode and the positive electrode and stacking the negative electrode and the positive electrode on each other with the separator therebetween in such a way that the negative electrode active material layer and the positive electrode active material layer face each other, wherein in the electrode plate forming step, the negative electrode active material layer is disposed in such a way that, in one end in a width direction of the negative and positive electrodes to be stacked, the negative electrode active material layer projects from an edge of the positive electrode active material layer in a direction in which the negative and positive electrode current collectors extend, and the undercoat layer projects from an edge of the negative active material layer in the direction, and the undercoat layer is disposed in such a way that the negative and positive electrode current collectors project from an outermost edge of the undercoat layer in the direction and the outermost edge of the undercoat layer projecting from the edge of the negative active material layer overlaps an exposed portion of the negative electrode current collector, no negative electrode active material layer being disposed on the exposed portion.

5. An electric storage device comprising an electrode assembly including a belt-shaped negative electrode, a belt-shaped positive electrode and a separator disposed between the negative electrode and the positive electrode, wherein the negative electrode includes a negative electrode current collector and a negative electrode active material layer disposed on at least one surface of the negative electrode current collector; and the positive electrode includes a positive electrode current collector, a positive electrode active material layer disposed on at least one surface of the positive electrode current collector, and an undercoat layer disposed between the positive electrode current collector and the positive electrode active material layer and being higher in resistance value than the positive electrode current collector, the undercoat layer comprising a conductive aid;

in the electrode assembly, the negative electrode and the positive electrode are stacked on each other with the separator therebetween in such a way that the negative electrode active material layer and the positive electrode active material layer face each other; and in the electrode assembly, in one end in a width direction of the thus stacked negative and positive electrodes, the negative electrode active material layer projects from an edge of the positive electrode active material layer in a direction in which the negative and positive electrode current collectors extend, and the undercoat layer projects from an edge of the negative active material layer in the direction, the negative electrode current collector projects from an outermost edge of the undercoat layer in the direction, and the outermost edge of the undercoat layer projecting from the edge of the negative active material layer overlaps an exposed portion of the negative electrode current collector, no negative electrode active material layer being disposed on the exposed portion.

* * * * *